(12) United States Patent
Lorentz et al.

(10) Patent No.: US 8,806,774 B2
(45) Date of Patent: Aug. 19, 2014

(54) OIL SANDS FLUID FINE TAILINGS DEWATERING USING RIM DITCHING

(71) Applicant: Syncrude Canada Ltd., Fort McMurray (CA)

(72) Inventors: James Lorentz, Fort McMurray (CA); Barry Bara, Edmonton (CA); Randy Mikula, Edmonton (CA); Eric Leneve, Fort McMurray (CA); Nan Wang, Edmonton (CA)

(73) Assignee: Syncrude Canada Ltd., Fort McMurray (CA), in trust for the owners of the Syncrude Project as such owners exist now and in the future ( * ) Notice: Subject to any disclaimer, the term of this patent is extended or adjusted under 35 U.S.C. 154(b) by 193 days.

(21) Appl. No.: 13/653,240

(22) Filed: Oct. 16, 2012

(65) Prior Publication Data

US 2014/0101967 A1   Apr. 17, 2014

(51) Int. Cl.
*F26B 7/00*   (2006.01)

(52) U.S. Cl.
CPC ........................... *F26B 7/00* (2013.01)
USPC ............... 34/386; 34/404; 34/423; 210/683; 209/167; 208/391; 166/272.3

(58) Field of Classification Search
USPC .......... 34/380, 381, 386, 404, 417, 423, 497, 34/524; 60/685; 210/660, 683; 209/166, 209/167; 208/390, 391; 166/272.1, 272.3, 166/303
See application file for complete search history.

(56) References Cited

U.S. PATENT DOCUMENTS

| | | | | |
|---|---|---|---|---|
| 3,805,713 | A * | 4/1974 | Notary et al. .................. | 110/245 |
| 4,541,752 | A * | 9/1985 | Phillips .................... | 405/129.85 |
| 5,118,219 | A * | 6/1992 | Walker, Jr. ............... | 405/129.45 |
| 6,007,708 | A * | 12/1999 | Allcock et al. ................ | 208/391 |
| 6,726,849 | B2 * | 4/2004 | Gay et al. ..................... | 252/88.1 |
| 8,137,566 | B2 * | 3/2012 | Bozak et al. .................. | 210/703 |
| 2009/0183599 | A1 * | 7/2009 | Mawby et al. .................. | 75/370 |
| 2012/0175315 | A1 * | 7/2012 | Revington et al. ............ | 210/732 |
| 2013/0112561 | A1 * | 5/2013 | Jajuee et al. .................. | 204/553 |
| 2014/0101967 | A1 * | 4/2014 | Lorentz et al. .................. | 34/386 |
| 2014/0150886 | A1 * | 6/2014 | Kan et al. ........................ | 137/13 |

FOREIGN PATENT DOCUMENTS

| | | | | |
|---|---|---|---|---|
| CN | 201074205 Y | * | 6/2008 | |
| CN | 103418177 | * | 12/2013 | |
| GB | 1504628 A | * | 3/1978 | |
| JP | 06312500 A | * | 11/1994 | ............. B41F 35/02 |
| WO | WO 2011143767 A1 | * | 11/2011 | |

OTHER PUBLICATIONS

Lahaie, R., et al. Development of Accelerated Dewatering Technology for Managing Oil Sands Fine Fluid Tailings, GEO2010. pp. 678-685.

* cited by examiner

*Primary Examiner* — Steve M Gravini
(74) *Attorney, Agent, or Firm* — Bennett Jones LLP

(57) ABSTRACT

A process of dewatering tailings is provided comprising mixing the tailings with a sufficient amount of an additive or a mixture thereof; depositing the resulting mixture into a disposal area; pumping water from the deposit to one or more sumps, and allowing the deposit to reach a sufficient strength; and removing remaining deposit water and rainfall through one or more of a network of ditches, a decant tower, or a plurality of dike drainage structures to yield a non-segregating deposit for reclamation.

15 Claims, 14 Drawing Sheets

US 8,806,774 B2

OIL SANDS FLUID FINE TAILINGS DEWATERING USING RIM DITCHING

FIELD OF THE INVENTION

The present invention relates to a process for dewatering oil sands tailings using rim ditching by modifying tailings properties with additives, and removing water and rainfall by drainage, ditching and decant structures to yield a trafficable deposit for reclamation.

BACKGROUND OF THE INVENTION

Oil sand generally comprises water-wet sand grains held together by a matrix of viscous heavy oil or bitumen. Bitumen is a complex and viscous mixture of large or heavy hydrocarbon molecules which contain a significant amount of sulfur, nitrogen and oxygen. The extraction of bitumen from sand using hot water processes yields large volumes of tailings composed of fine silts, clays and residual bitumen which have to be contained in a tailings pond. Mineral fractions with a particle diameter less than 44 microns are referred to as "fines." These fines are typically quartz and clay mineral suspensions, predominantly kaolinite and illite.

The fine tailings suspension is typically 85% water and 15% fine particles by volume. Dewatering of fine tailings occurs very slowly. When first discharged in the pond, the very low density material is referred to as thin fine tailings. After a few years when the fine tailings have reached a solids content of about 30-35%, they are sometimes referred to as mature fine tailings (MFT). Hereinafter, the more general term of fluid fine tailings (FFT) which encompasses the spectrum of tailings from discharge to final settled state. The fluid fine tailings behave as a fluid colloidal-like material. The fact that fluid fine tailings behave as a fluid and have very slow consolidation rates limits options to reclaim tailings ponds. A challenge facing the industry remains the removal of water from the fluid fine tailings to increase the solids content well beyond 35% and strengthen the deposits to the point that they can be reclaimed and no longer require containment.

Accordingly, there is a need for an improved method of dewatering tailings.

SUMMARY OF THE INVENTION

The current application is directed to a process for dewatering oil sands tailings using rim ditching by modifying tailings properties with additives, and removing water and rainfall by drainage, ditching and decant structures to yield a trafficable deposit for reclamation. The present invention is particularly useful with, but not limited to, fluid fine tailings. It was surprisingly discovered that by conducting the process of the present invention, one or more of the following benefits may be realized:

(1) Modifying the tailings properties by use of additives enhances strength development, drainage and evaporation in the resulting deposit. In particular, lime alone or a mixture of lime and gypsum combined with the tailings increases cracking of the deposit thereby enhancing evaporation, and reduces the total amount of dissolved solids content in the release water. Addition of a polymeric flocculant (typically a high molecular weight, medium charge density anionic polyacrylamide) to the tailings improves initial and subsequent water drainage to a greater extent than lime and gypsum. Other additives which manipulate the initial strength and dewatering of the fluid fine tailings such as alum, other flocculant formulations, or combinations of inorganic and organic mineral suspension modifiers would also be very effective in this application.

(2) Initial release water is removed rapidly from the deposit by pumping from sumps, or from the toe of the deposit, depending upon the deposit design (3) Removing subsequent release water and rainfall from the deposit is managed efficiently using drainage, ditching and decant structures. The rapid removal and control of release water and rainfall or runoff accelerates consolidation and dewatering.

Thus, use of the present invention yields a tailings deposit which becomes trafficable soon after its disposal in a rim ditch, and enables reclamation of tailings disposal areas.

In one aspect, a process for dewatering tailings is provided, comprising:
mixing the tailings with a sufficient amount of an additive or a mixture thereof;
depositing the resulting mixture into a containment area;
rapidly removing the initially released water from the deposit to one or more sumps, and allowing the deposit to reach a sufficient strength; and
removing remaining deposit water and rainfall through one or more of a network of ditches, a decant tower, or a plurality of dike drainage structures to yield a rapidly consolidating deposit for reclamation.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF THE PREFERRED EMBODIMENTS

Figure 1:
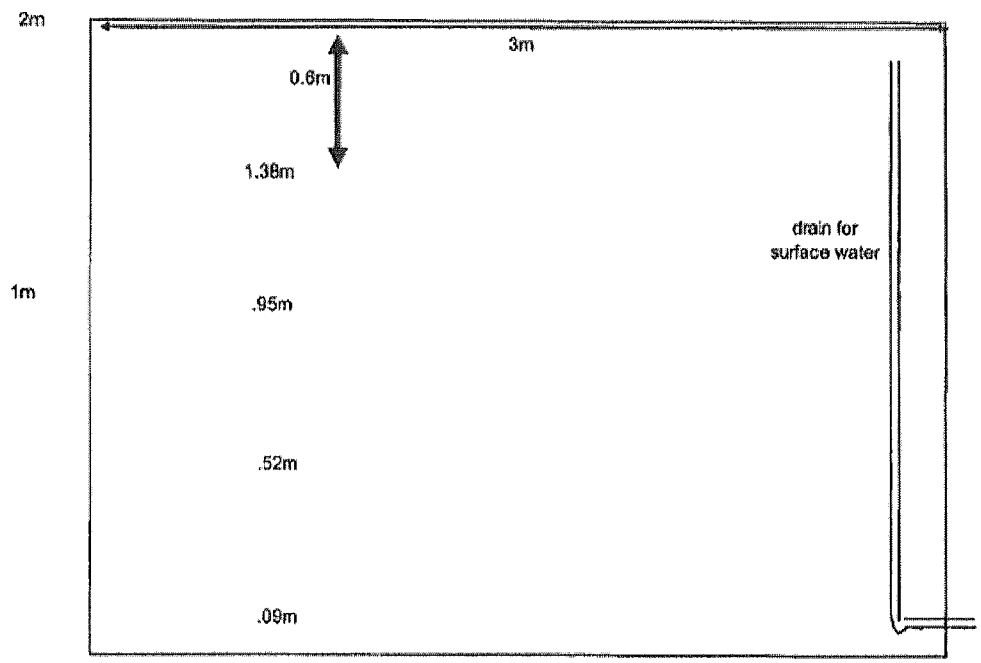
FIG. 1 is a diagram showing the approximate FFT test dimensions and piezometer locations.

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention relates generally to a process of improving the dewatering of tailings in rim ditching applications. Rim ditching is a common method of accelerating the dewatering of tailings, whereby the degree of saturation is controlled by preventing standing water from accumulating on the tailings deposit. The pressure of the material above helps to squeeze water out of the deposit. When enough strength is reached, a continuous ditch is created around the edge of the deposit to allow for accumulation of the water pushed from the pore spaces. With extensive deposit cracking and the construction of a ditch to collect water and guide it to a collection sump, tailings dewatering can be enhanced. The more rapidly strength develops in the tailings deposit, the more quickly and deeply the rim ditch can be constructed. However, vagaries of the weather (i.e., control and removal of rainfall) make rim ditching challenging to manage.

The process of the invention includes modifying the properties of the oil sands tailings by use of additives to enhance deposit cracking and strength development, drainage and evaporation in the resulting deposit; and removing water and rainfall from the deposit efficiently by use of particular drainage, ditching and decant structures which accelerate consolidation and dewatering. The process thus forms a tailings deposit which is trafficable soon after its disposal in the rim ditch deposit containment area.

As used herein, the term "tailings" means tailings derived from oil sands extraction operations and containing a fines fraction. The term is meant to include fluid fine tailings (FFT) from tailings ponds and fine tailings from ongoing extraction operations (for example, flotation tailings, thickener underflow or froth treatment tailings) which may or may not bypass a tailings pond. In one embodiment, the tailings are primarily FFT obtained from tailings ponds given the significant quantities of such material to reclaim. However, it should be understood that the fine tailings treated according the process of the present invention are not necessarily obtained from a tailings pond, and may also be obtained from ongoing oil sands extraction operations.

In the process of the invention, a sufficient amount of an additive or a mixture of additives is first added to the tailings. In one embodiment, the additive is introduced into an in-line flow of the FFT. As used herein, the term "in-line flow" means a flow contained within a continuous fluid transportation line such as a pipe or another fluid transport structure which preferably has an enclosed tubular construction. In one embodiment, the additive is combined with the FFT in a mixer. Suitable additive introduction can include, but are not limited to, dynamic mixers, T mixers, static mixers, and continuous-flow stirred-tank reactors. Preferably, the mixer is a dynamic mixer in order to better optimize the additive/FFT interaction. A typical dynamic mixer is powered by an electric motor and contains one or more mixing elements which perform a rotary motion about the axis of the flow path. The speed and configuration of the mixing elements can be easily modified to fine-tune the mixing process for products which are susceptible to variations in raw material. Mixing is conducted for a sufficient duration in order to allow the tailings and additive to combine properly and to ensure the efficiency of the additive.

The preferred additive or mixture of additives may be selected according to the tailings composition and process conditions. However, optimum additives have been identified for the effective dewatering of tailings and production of amenable recycle water. Suitable additives include, but are not limited to, flocculants, coagulants, an additive comprising at least one multivalent cation, and other reagents that modify the rheology and cracking behaviour of the tailings deposit.

As used herein, the term "flocculant" refers to a reagent which bridges the neutralized or coagulated particles into larger agglomerates, resulting in more efficient settling. Flocculants useful in the present invention are generally anionic, nonionic, cationic or amphoteric polymers, which may be naturally occurring or synthetic, having relatively high molecular weights. Preferably, the polymeric flocculants are characterized by molecular weights ranging between about 1,000 kD to about 50,000 kD. Suitable natural polymeric flocculants may be polysaccharides such as dextran, starch or guar gum. Suitable synthetic polymeric flocculants include, but are not limited to, charged or uncharged polyacrylamides, for example, a high molecular weight polyacrylamide-sodium polyacrylate co-polymer.

Other useful polymeric flocculants can be made by the polymerization of (meth)acryamide, N-vinyl pyrrolidone, N-vinyl formamide, N,N dimethylacrylamide, N-vinyl acetamide, N-vinylpyridine, N-vinylimidazole, isopropyl acrylamide and polyethylene glycol methacrylate, and one or more anionic monomer(s) such as acrylic acid, methacrylic acid, 2-acrylamido-2-methylpropane sulphonic acid (ATBS) and salts thereof, or one or more cationic monomer(s) such as dimethylaminoethyl acrylate (ADAME), dimethylaminoethyl methacrylate (MADAME), dimethydiallylammonium chloride (DADMAC), acrylamido propyltrimethyl ammonium chloride (APTAC) and/or methacrylamido propyltrimethyl ammonium chloride (MAPTAC).

In one embodiment, the flocculant comprises an aqueous solution of an anionic polyacrylamide. The anionic polyacrylamide preferably has a relatively high molecular weight (about 10,000 kD or higher) and medium charge density (about 20-35% anionicity), for example, a high molecular weight polyacrylamide-sodium polyacrylate co-polymer.

It will be appreciated by those skilled in the art that various modifications (e.g., branched or straight chain modifications, charge density, molecular weight, dosage) to the flocculant may be contemplated.

As used herein, the term "coagulant" refers to a reagent which neutralizes repulsive electrical charges surrounding particles to destabilize suspended solids and to cause the solids to agglomerate. Suitable coagulants useful in the present invention include, but are not limited to, lime (calcium oxide), slaked lime (calcium hydroxide), gypsum (calcium sulfate dehydrate), polyamine, alum, or any combination thereof.

Lime has the advantage of not generating deleterious compounds. In one embodiment, the additive comprises lime in a concentration ranging from about 0.10% to about 0.25%. In one embodiment, the additive comprises a mixture of lime and gypsum. In one embodiment, the mixture comprises lime in a concentration ranging from about 0.10% to about 0.25%, and gypsum in a concentration ranging from about 0.10% to about 0.25%. In one embodiment, the concentrations of lime and gypsum are the same. In one embodiment, the mixture comprises 0.125% lime and 0.125% gypsum. In one embodiment, the mixture comprises 0.185% lime and 0.185% gypsum. In one embodiment, the mixture comprises 0.25% lime and 0.25% gypsum. The optimum combinations will vary depending upon the initial water chemistry of the fluid fine tailings and any desire to control the resulting release water chemistry.

As used herein, the term "multivalent" means an element having more than one valence. Valence is defined as the number of valence bonds formed by a given atom. Suitable multivalent inorganic additives may comprise divalent or trivalent cations. Divalent cations increase the adhesion of bitumen to clay particles and the coagulation of clay particles, and include, but are not limited to, calcium ($Ca^{2+}$), magnesium ($Mg^{2+}$), iron ($Fe^{2+}$), and barium ($Ba^{2+}$). Trivalent cations include, but are not limited to, aluminium ($Al^{3+}$), iron ($Fe^{3+}$). Various reagents may be added to raise or lower the pH of the FFT, while also improving dewatering, consolidation, and deposit crack formation. Such reagents include, but are not limited to, sulphuric acid, carbon dioxide, phosphoric acid, sodium phosphate, sodium carbonate, hydrochloric acid, calcium oxide, calcium hydroxide, potassium hydroxide, sodium silicate, Portland cement, and others. Preferably, an alkaline pH ensures that the release water will ultimately have a basic pH amenable for recycling to the extraction process which is typically conducted under conditions of alkaline pH.

As demonstrated in the Example, addition of either lime alone or a mixture of lime and gypsum to the FFT increases cracking of the deposit thereby enhancing evaporation, and reduces the total amount of dissolved solids (TDS) content in the release water. As used herein, the term "TDS" means the total amount of mobile charged ions including minerals, salts or metals dissolved in a given volume of water. TDS is used as a common parameter for assessing water quality. High concentrations of TDS in release water are considered detrimental to bitumen recovery through disruption of extraction chemistry, and scaling, corrosion and fouling of equipment. However, lime addition precipitates calcium carbonate from the release water. In one embodiment, a mixture of lime and gypsum is preferred due to having a synergistic effect.

Addition of a polymeric flocculant to the FFT improves drainage to a greater extent than lime and gypsum, although cracking is not as extensive as with lime and gypsum. In one embodiment, the dosage of flocculant ranges from about 400 grams to about 1,500 grams per tonne of solids in the FFT. Accordingly, the tailings may be treated with an additive or mixture of additives either prior to treatment with a flocculant, or following treatment with a flocculant. Adding the additive prior to treatment with a flocculant minimizes the amount of required flocculant which is relatively expensive. Adding the additive after flocculant treatment may improve deposit performance and release water quality.

The treated tailings may be deposited into a retaining impoundment which may be constructed in a mined-out pit or in a specifically constructed disposal area. The impoundment is of a sufficient size to retain the treated tailings. Tailings can be deposited using various subaerial techniques, the choice of which affects how the tailings deposit will initially form and settle within the impoundment. Preferably, the treated tailings are deposited at a controlled rate to optimize the release of water. When the evaporation rate from the tailings deposit is sufficient, a crust forms on top of the deposit. The additive treatment causes the formation of cracks in the crust and throughout the interior of the deposit, thereby increasing the surface area for evaporation and providing a network of cracks or channels through which the water may drain and be recovered. The released water is rapidly removed using one or more pumps and/or by directing it via ditches to sumps or other collection points where it can be removed. Any suitable water removal pumps as are known in the art may be used.

Removal of any remaining deposit water and subsequent rainfall is managed by a network of ditches which channel the water and rainfall from the deposit to one or more sumps. As used herein, the term "sump" means a pit designed to receive water. The sump is of a sufficient size to retain water. The sump is capable of simultaneously decanting rainwater and accommodating subsidence as the deposit dewaters. The deposit and ditching network are monitored and maintained regularly to ensure an absence of standing water which may inhibit deposit dewatering.

The ditches may be formed once water release from the deposit appears to have decreased and the deposit has sufficient strength to maintain a depression or low point in the treated tailings material. It will be recognized by those skilled in the art that this would typically occur as the deposit approaches the liquid limit. The term "liquid limit" means the moisture content at which a material begins to behave as a liquid. However, depending upon the amount of additive and the nature of the crust formed on the deposit, it may be possible to reach liquid limit behavior at lower solids content. Without being bound by any theory, the purpose of the ditch network is to control rainfall; however, as the deposit increases in strength, the material from the ditches provides a stress which increases consolidation.

Preferably, the pumps and sumps are positioned remote from the point at which the treated tailings are deposited in order to minimize flat or dead areas where water may collect and inhibit the dewatering process.

In one embodiment, removal of any remaining deposit water and rainfall is controlled by a decant tower positioned at the lowest point of the deposit. The decant tower is an intake structure comprising a vertical or inclined hollow tower which allows standing water to be pumped out of the tower or drain by gravity via a conduit or pipe into a sump. In one embodiment, the decant tower comprises a cascade decant tower. The cascade decant tower allows water to flow over a variable weir into the sump. The height of the weir is adjustable to accommodate the reduction in the elevation of the deposit as a result of dewatering and consolidation. In one embodiment, multiple dike drainage structures may be stacked to create a sump of a desired depth in accordance with the rim ditch deposit geometry.

The collected water and rainfall may be recycled to the extraction process so that the amount of makeup water required is minimized. Once the tailings deposit has eventually dried and appears to have a suitable density to allow load-bearing, the deposit may be used as a trafficable surface for reclamation. Any common tailings management approach would be used to accelerate the reclamation process, including the addition of wick drains to the deposit, loading the deposit with a surcharge of sand or coke, or other common methods or combination of methods.

Exemplary embodiments of the present invention are described in the following Example, which is set forth to aid in the understanding of the invention, and should not be construed to limit in any way the scope of the invention as defined in the claims which follow thereafter.

Example 1

The effects of the addition of lime and gypsum to fluid fine tailings in a rim ditch process were assessed, with particular focus upon evaporative drying and comparing the drying rate with and without the addition of inorganic reagents. 100 kg test cells and two 14 $m^3$ or 17,000 kg test cells were used. The two large cells were instrumented to measure pore pressure as a function of depth in the cell and selected samples were evaluated for water chemistry changes. The pore pressure dissipation with evaporation was monitored for over one year for the large cells and evaporation rate for about eight weeks for the smaller 100 kg cells.

Lime and gypsum were added to FFT samples and mixed for more than thirty minutes before being transferred into the 14 m$^3$ test cells. The smaller 100 kg tests were thoroughly mixed using a large hand held mixer. Lime and gypsum additives were added on a weight of slurry basis. Where possible, water samples were collected to determine the water chemistry. After drying, re-wetting experiments were conducted to determine re-wetting and run off water chemistries. Standard methods were used to evaluate sample composition, water chemistry, particle size distribution, and clay content.

i. Large (14 m$^3$) Bin Tests

Two separate, large volume FFT samples were characterized (Table 1). Although the two samples represented FFT collected several weeks apart, the solids, bitumen, and clay contents were similar. Table 1 includes the milli-equivalents of methylene blue adsorbed by the solids as determined by Dean-Stark and slurry methylene blue index (MBI) methods. In both cases, the results were about the same, indicating that the FFT samples exhibited similar clay contents. The clay content was confirmed with the sedigraph analysis, indicating that approximately 53% of the solids are clay sized in both of the samples.

TABLE 1

| Sample | Bitumen (%) | Water (%) | Mineral (%) | % Passing 45 μm sieve | MBI meq/100 g | Slurry MBI meq/100 g | % Passing 44 μm (sedigraph method) | % Passing 2 μm (sedigraph method) |
|---|---|---|---|---|---|---|---|---|
| FFT untreated | 1.7 | 63.2 | 34.9 | 97.7 | 10.1 | 8.2 | 98.6 | 53.5 |
| FFT treated | 0.8 | 60.0 | 33.6 | 95.1 | 9.8 | 8.0 | 98.1 | 53.2 |

Figure 2:
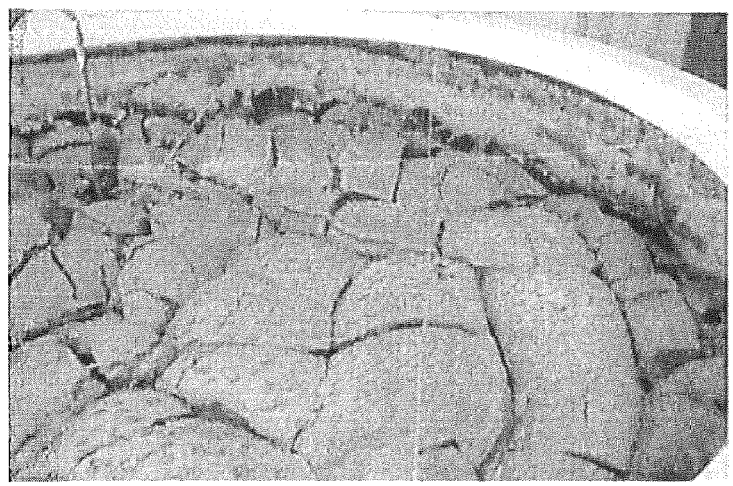
FIG. 2 is a photograph of untreated FFT after ten months showing little consolidation and shallow cracks.
Figure 3:
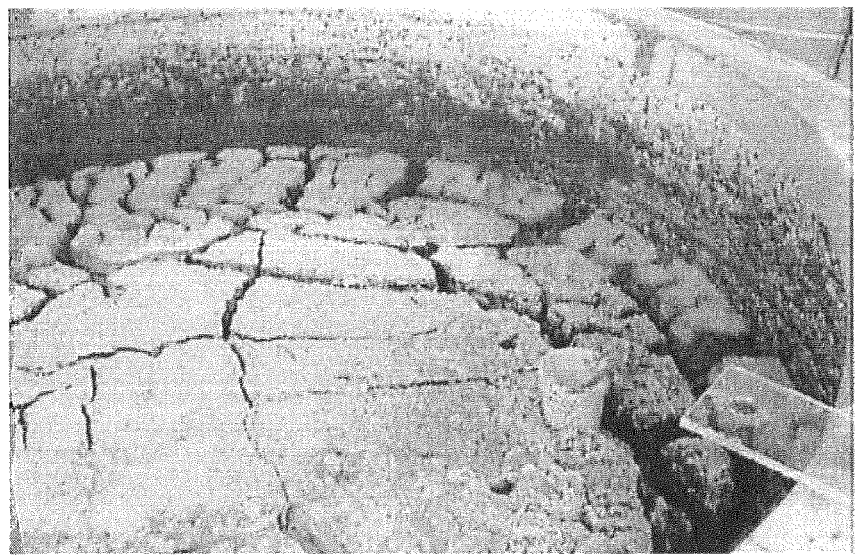
FIG. 3 is a photograph of lime and gypsum treated FFT showing extensive consolidation and deep cracks.

FIG. 1 shows the approximate locations of four (4) piezometers, 1.38 m, 0.95 m, 0.52 m and 0.09 m (from top to bottom), installed in the deposit to measure pressures as a function of depth. Each bin was filled to the 190 cm level at the start of the experiment, which was also the height of a collapsible tube designed to drain the surface water away as the FFT consolidated. FIGS. 2 and 3 show the untreated and treated (0.25% lime, 0.25% gypsum by weight) samples, respectively, near the end of the experiment. A fan was used at each bin to mimic wind conditions.

The treated FFT clearly performed better since no water was collected by drainage for the untreated FFT. Ditching for the untreated FFT was abandoned due to lack of strength gain. Strength gain allows for the maintenance of a ditch. A significant amount of water was collected for the treated FFT. The water chemistry results are set out in Table 2. Due to a passive water collection system, samples were not provided for water chemistry analysis for days or weeks after collection. Consequently, carbon dioxide from the air may have reduced the pH. The release water contained essentially no solids. The increase in total dissolved solids over time may be due to evaporation of water from the deposit sample. The lack of any release water from the untreated FFT test was attributed to the fact that evaporation was faster than drainage.

TABLE 2

| Sample ID | Ca | K | Mg | Na | Cl | SO$_4$ | HCO$_3$ | CO$_3$ | pH | Ion balance | Total dissolved solids |
|---|---|---|---|---|---|---|---|---|---|---|---|
| Pail 1 Day 1 | 329 | 29 | 4 | 1313 | 712 | 2446 | 64 | 13 | 8.66 | 1.03 | 4911 |
| Pail 2 Day 1 | 328 | 29 | 5 | 1328 | 705 | 2423 | 60 | 15 | 8.71 | 1.05 | 4893 |
| Pail 3 Day 1 | 351 | 34 | 4 | 1336 | 708 | 2431 | 63 | 14 | 8.68 | 1.07 | 4942 |
| Day 10 | 330 | | 5 | 1571 | 905 | 3034 | 74 | 8 | 8.51 | 1.08 | |
| Day 15 | 488 | 39 | 5 | 1721 | 1018 | 3426 | 89 | 0 | 7.85 | 0.99 | 6785 |
| Day 17 | 477 | 39 | 11 | 1687 | 952 | 3178 | 89 | 0 | 7.97 | 1.05 | 6435 |
| Day 21 | 501 | 41 | 6 | 1789 | 1090 | 3594 | 92 | 0 | 7.83 | 0.97 | 7113 |

Figure 4:
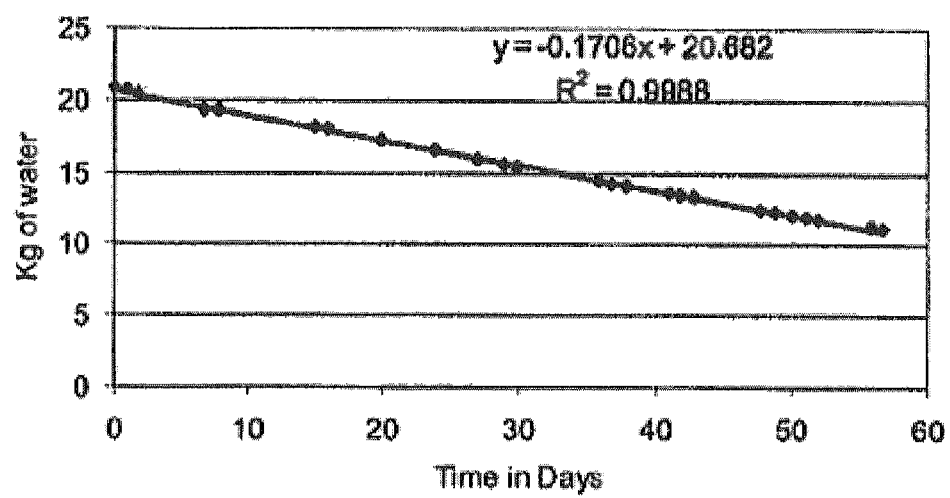
FIG. 4 is a graph showing the weight loss of a standard 20 L pail of water over time, with the rate corresponding to approximately 2 cm of water per week.

The initial water release from the treated FFT was about 542 kg (over eight days), after which water drainage stopped due to problems with the retractable drain pipe in the deposit. The 542 kg of water represented about 7.5 cm depth given the 7 m² surface area of the test bin. FIG. 4 shows the pan evaporation rate as determined from the loss of weight of a water sample over time. The rate of water loss was 0.17 kg per day or 1.2 kg per week. With the area of the water pail at approximately 610 cm², the evaporation rate was about 2 cm per week. The rate of pressure change in the piezometers should reflect the sum of the water lost due to evaporation plus the water which was drained as the sample consolidated, but these changes are essentially in the noise of the piezometer readings when corrected for atmospheric pressure. 7 cm of water represented approximately 0.7 kPa with atmospheric pressure being in the range of 92±0.2.

Figure 5:
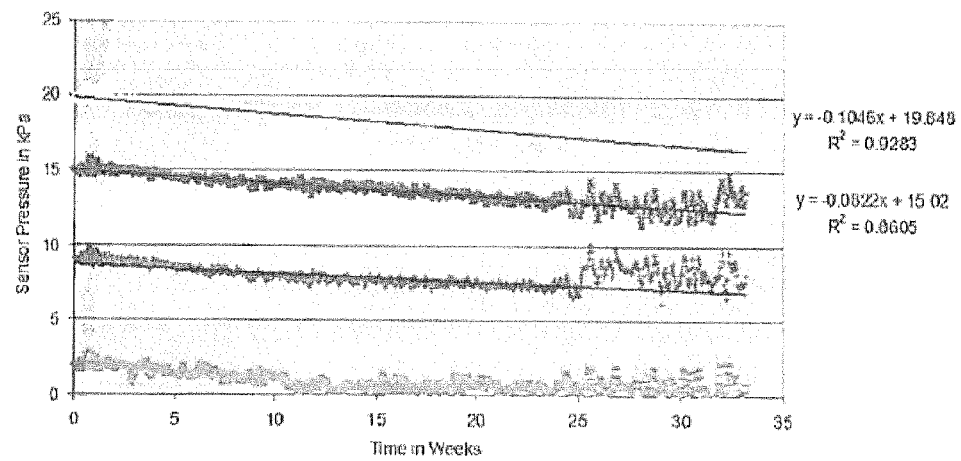
FIG. 5 is a graph showing pressure drop over time for an untreated FFT sample.
Figure 6:
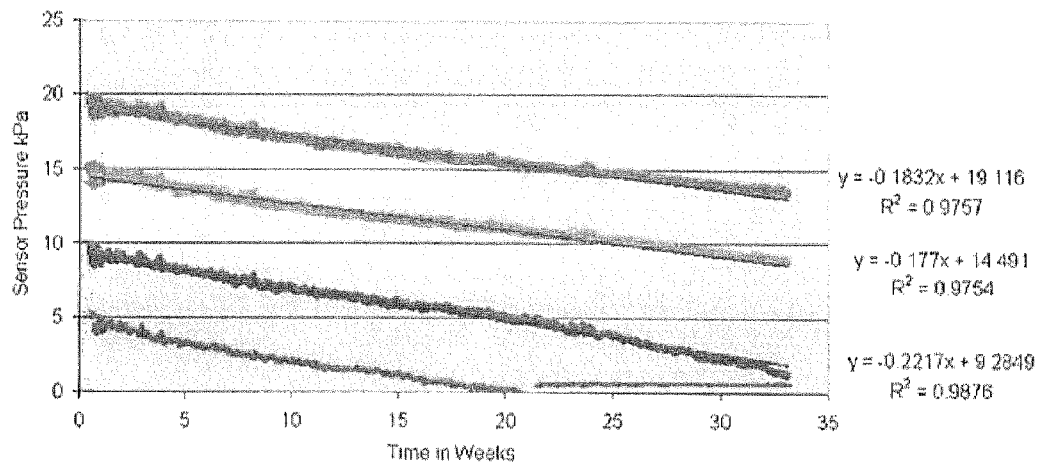
FIG. 6 is a graph showing pressure drop over time for a FFT sample treated with 0.25% lime and 0.25% gypsum.
Figure 7:
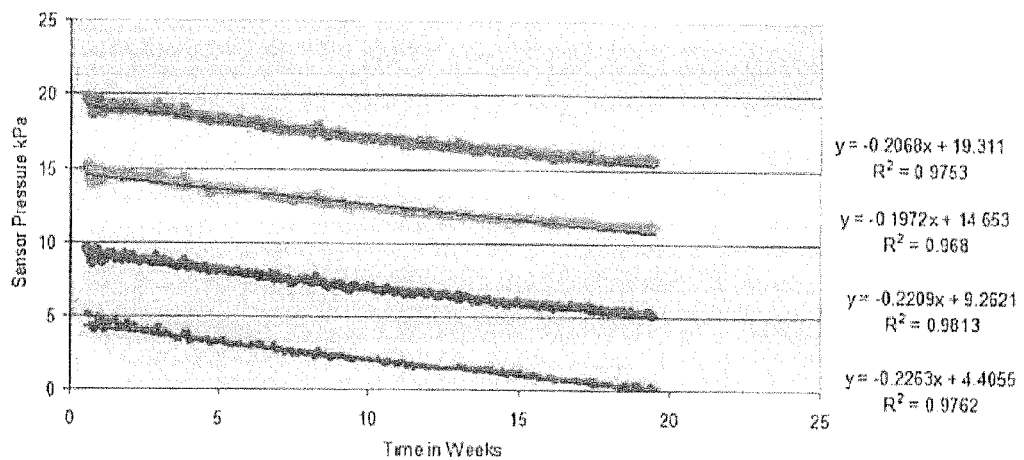
FIG. 7 is a graph showing pressure readings over time for the chemically amended FFT test.
Figure 8:
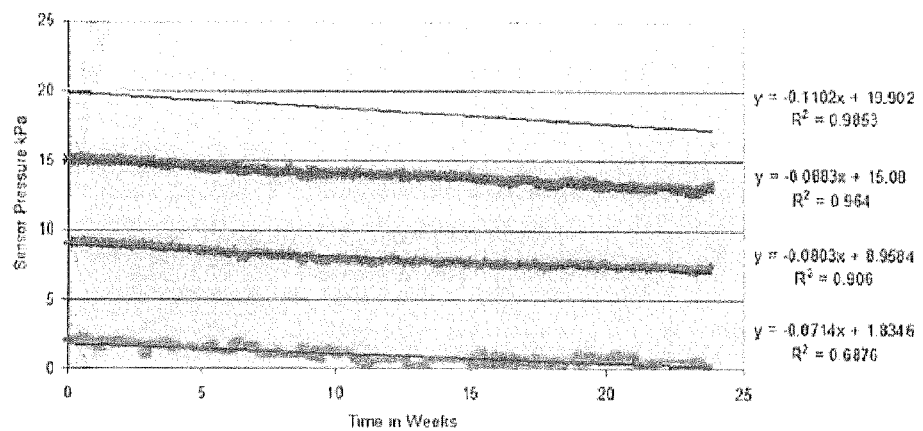
FIG. 8 is a graph showing pressure readings over time for the control, untreated FFT.
Figure 9:
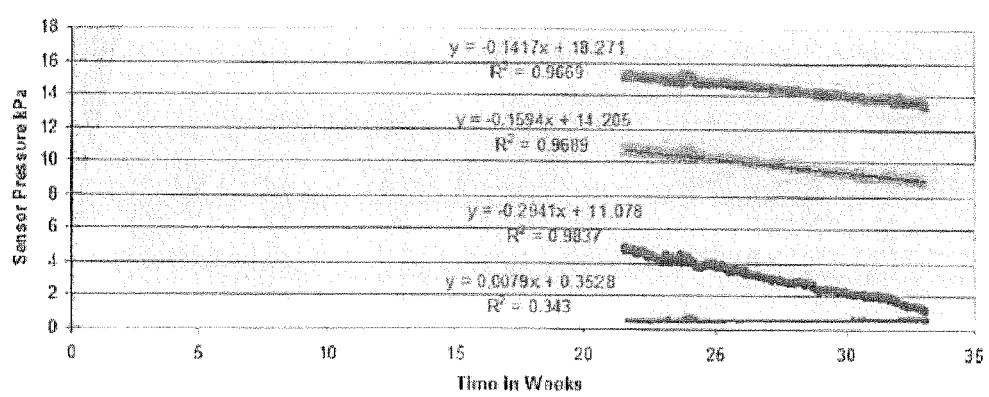
FIG. 9 is a graph showing the later dewatering rate for the treated FFT sample.

FIGS. 5 and 6 show the sensor pressure in kPa for untreated and treated FFT (0.25% lime, 0.25% gypsum), respectively. FIG. 6 shows that there was a steady drop in corrected pressure (0.2 kPa per week) corresponding to a loss of water of about 2 cm per week in the treated FFT. In FIGS. 5 and 6, the highest pressure readings are for the deepest piezometers. When the piezometer is no longer under water, the pressure reading approaches zero. The untreated FFT showed a rate of pressure drop of approximately half of the rate (FIG. 5) compared to the treated FFT, indicating a significant improvement in dewatering and consolidation compared to the untreated FFT. FIG. 5 also indicated problems with the piezometers in the untreated sample after about 25 weeks (note the increased scatter in the readings), but this has no impact on the conclusions regarding the significant difference in evaporation rate for the treated and untreated FFT. The evaporation rate from a slurry sample is seldom equal to the rate from a liquid water surface, but for the test bins, the fan would improve the evaporation rate. In addition, the extensive and deep cracks in the treated FFT would increase the effective evaporative surface area for the FFT slurry sample.

ii. Small Scale Evaporation Rate Experiments

Small scale tests were conducted to assess the relationship between chemical addition and dewatering via evaporation. The data showed that there is likely an optimum lime/gypsum dosage which optimizes cracking and evaporation without leading to reduction in evaporation due to salt accumulation. Three sets of small scale tests were conducted to establish a reasonably scaled index test to evaluate dewatering. These were lab scale (1-2 kg) and two lab pilot scales at nominally 45 kg or 150 kg.

a) Lab Scale Dewatering Tests (1-2 kg)

Figure 10:
FIG. 10 is a photograph showing the experimental set up for the pan drying tests at the start of the experiment (left) and after thirty days (right).
Figure 11:
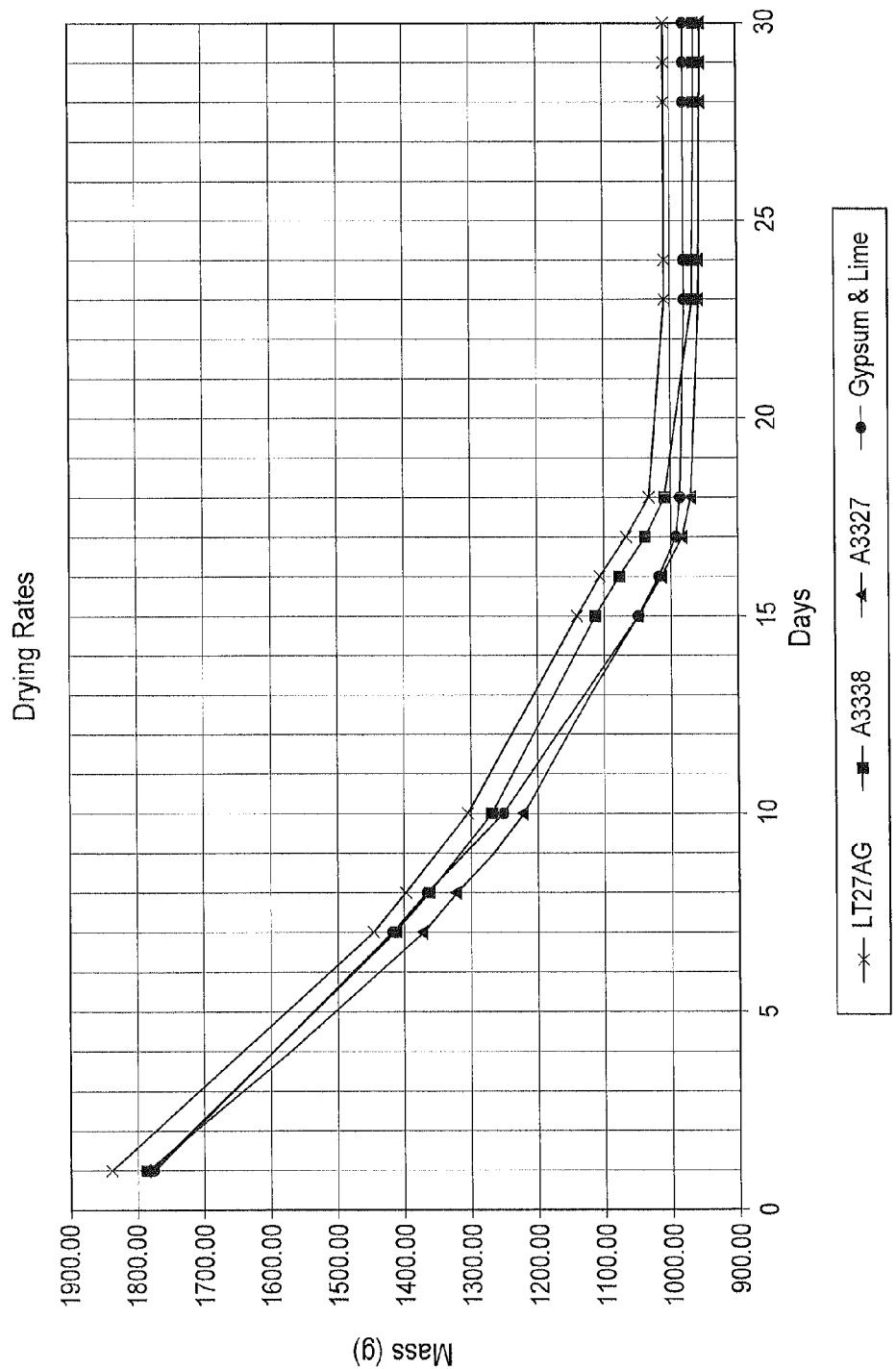
FIG. 11 is a graph showing the drying rates for the samples of FIG. 10.

Initial small scale testing of various polymer and inorganic ion mixtures was conducted using a 5% slope and a paper towel base to prevent the mixture from sliding to the bottom of the pan. Two polymers were tested, both high molecular weight, medium charge density, anionic polyacrylamides. Polymer A was a predominantly branched polymer, while polymer B was predominantly straight chained. The inorganic ion mixture tested was lime/gypsum. The polymer addition was 500 g/tonne on a slurry basis, or about 1400 g/tonne of dry solids. The lime and gypsum was added as 0.25% of each on a slurry basis. The results are shown in FIGS. 10 and 11. The tests were performed in duplicate. With reference to FIG. 10, illustrated from top to bottom, the top two trays are untreated FFT, the next two trays are FFT treated with polymer A, the next two trays are FFT treated with polymer B, and the bottom two trays are FFT treated with gypsum and lime.

As shown in FIG. 10, the polymer samples had sufficient strength to sit on the upper part of the drying tray, and little or no cracking was evident as the samples underwent significant shrinkage as they dried. The lime/gypsum sample filled the tray more uniformly and underwent significant cracking. Since cracking increases evaporation by increasing available surface area, these tests were repeated with larger 2 kg samples spread across the tray in order to try to create a uniform sample cracking opportunity. The A and B polymers released a significant amount of water at the start of the experiment as evidenced by the saturated paper towel. The lime and gypsum sample did not develop an initial strength and coverage of the pan was more uniform than that for the FFT and polymer mixes. FIG. 11 shows that the drying rates for all samples were similar where 1.2 kg of sample was set up for drying.

Figure 12:
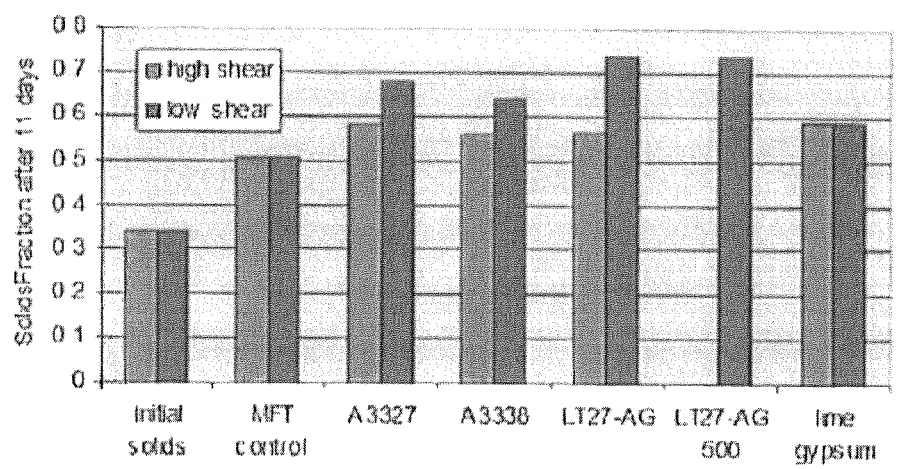
FIG. 12 is a graph showing the solids fraction reached after eleven days of drying for a variety of polymers and lime/gypsum additives.

FIG. 12 shows the increase in solids fraction after eleven days of drying for a variety of polymers and lime and gypsum samples. The data confirm the above experiments, with the exception that when polymer was introduced under low shear conditions, significantly greater cracking was observed, along with measurably greater drying rates. The drying process is complex, with surface area, shrinkage, and salt accumulation all playing a role in the drying rate. In addition, polymer mixing is important. Drainage of water is also a factor, as observed by the difference in the amount of water adsorbed into the paper backing of the 1.2 kg tests. Since these small scale tests did not allow for quantification of the amount of drainage water relative to the evaporated water, larger tests were run to collect and quantify drainage and evaporated water.

b) Lab Pilot Dewatering Tests (45 kg)

Figure 13:
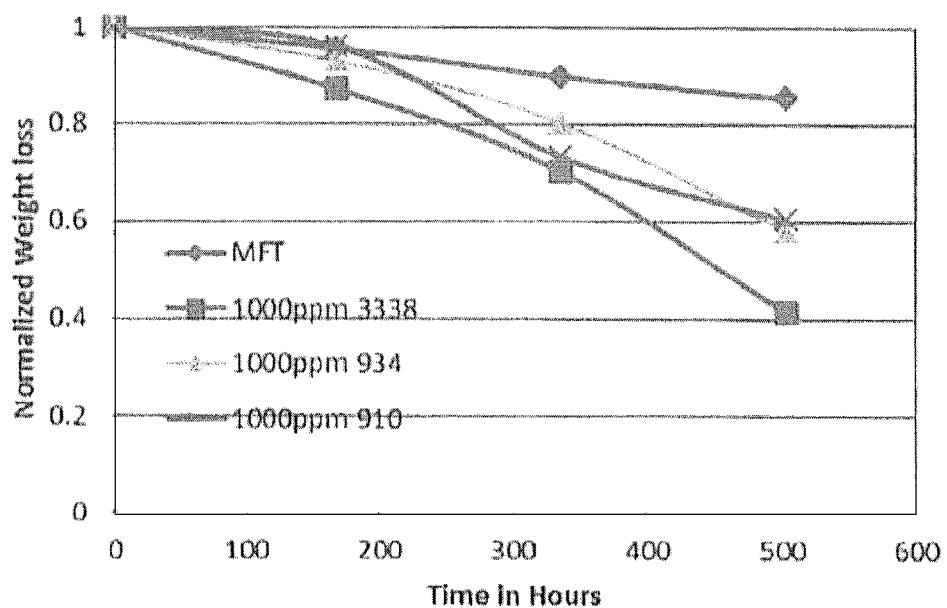
FIG. 13 is a graph showing the drying rate for the 45 kg tests for different polymer types.

Large plastic containers containing about 45 kg of treated FFT were evaluated for drying rate with three anionic polyacrylamides. Polymer C is a very high molecular weight medium charge density polyacrylamide, and Polymer D is a very high molecular weight low charge density polymer. FIG. 13 and Table 3 summarize the results over 3 weeks.

TABLE 3

| Sample | 0 hours | 168 hours (1 week) | 336 hours (2 weeks) | 504 hours (3 weeks) |
|---|---|---|---|---|
| FFT | 1 | 0.96 | 0.90 | 0.85 |
| 700 ppm polymer A | 1 | 0.92 | 0.70 | 0.48 |
| 1000 ppm polymer A | 1 | 0.87 | 0.70 | 0.41 |
| 1300 ppm polymer A | 1 | 0.83 | 0.74 | 0.36 |
| 700 ppm Polymer C | 1 | 0.93 | 0.87 | 0.74 |
| 1000 ppm Polymer C | 1 | 0.93 | 0.80 | 0.58 |
| 1300 ppm Polymer C | 1 | 0.90 | 0.80 | 0.54 |
| 700 ppm Polymer D | 1 | 0.97 | 0.86 | 0.72 |
| 1000 ppm Polymer D | 1 | 0.96 | 0.73 | 0.60 |
| 1300 ppm Polymer D | 1 | 0.94 | 0.75 | 0.54 |

This test scale was not large enough to allow for removal of surface or drainage water, even though for some test samples, significant amounts of water were released. Dewatering was defined only by the pan evaporation rate until all of the water had evaporated from the surface and shrinkage and cracking mechanisms began to play a role. As a result of this limitation, it is difficult to gauge accurately the dewatering performance that would occur in the field where a deposition slope would allow for water drainage and exposure of the slurry surface for evaporative dewatering.

c) Lab Pilot Dewatering Tests (150 kg)

Figure 14:
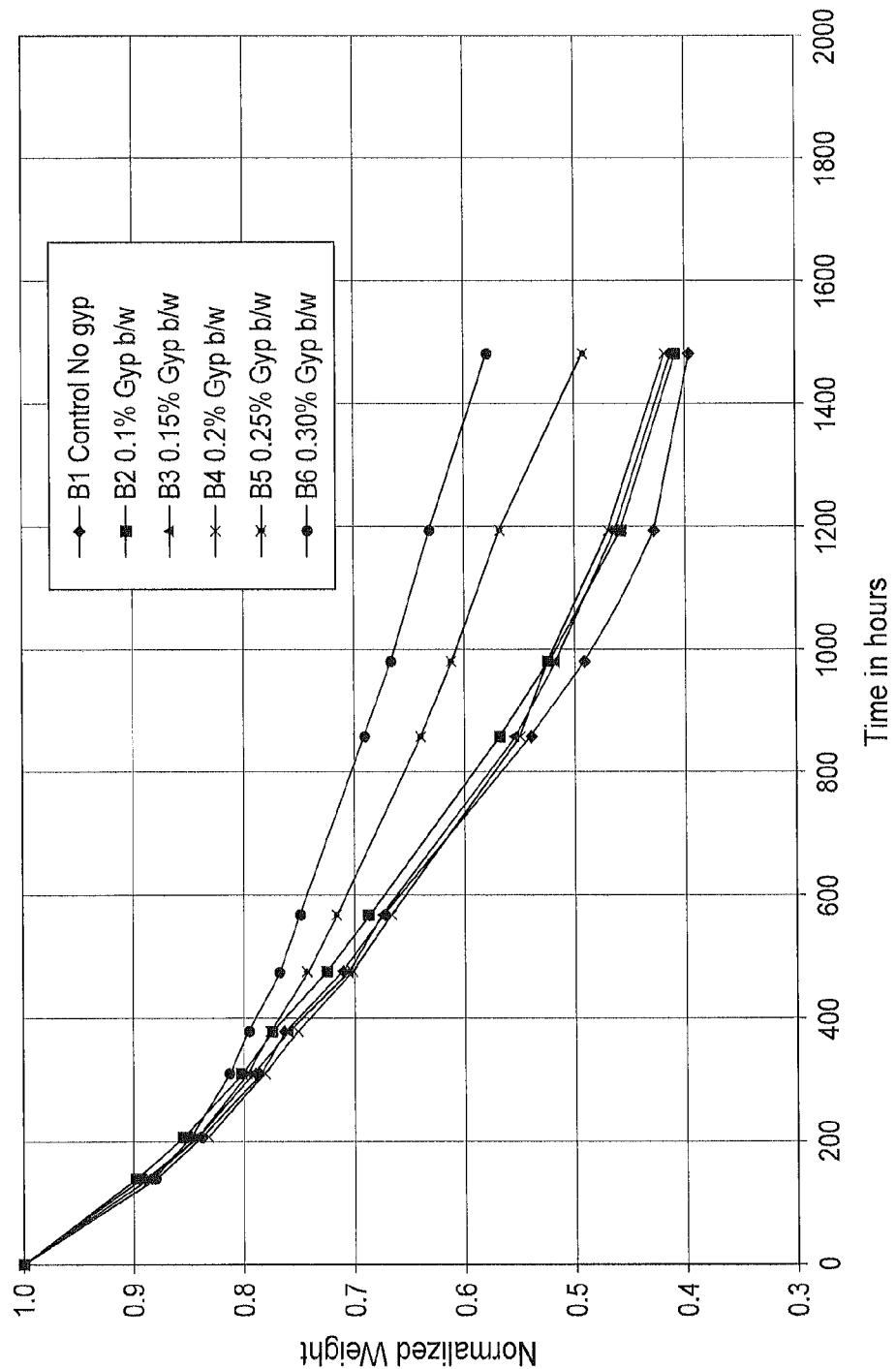
FIG. 14 is a graph showing the reduced evaporation rate over time with gypsum addition to FFT.
Figure 15:
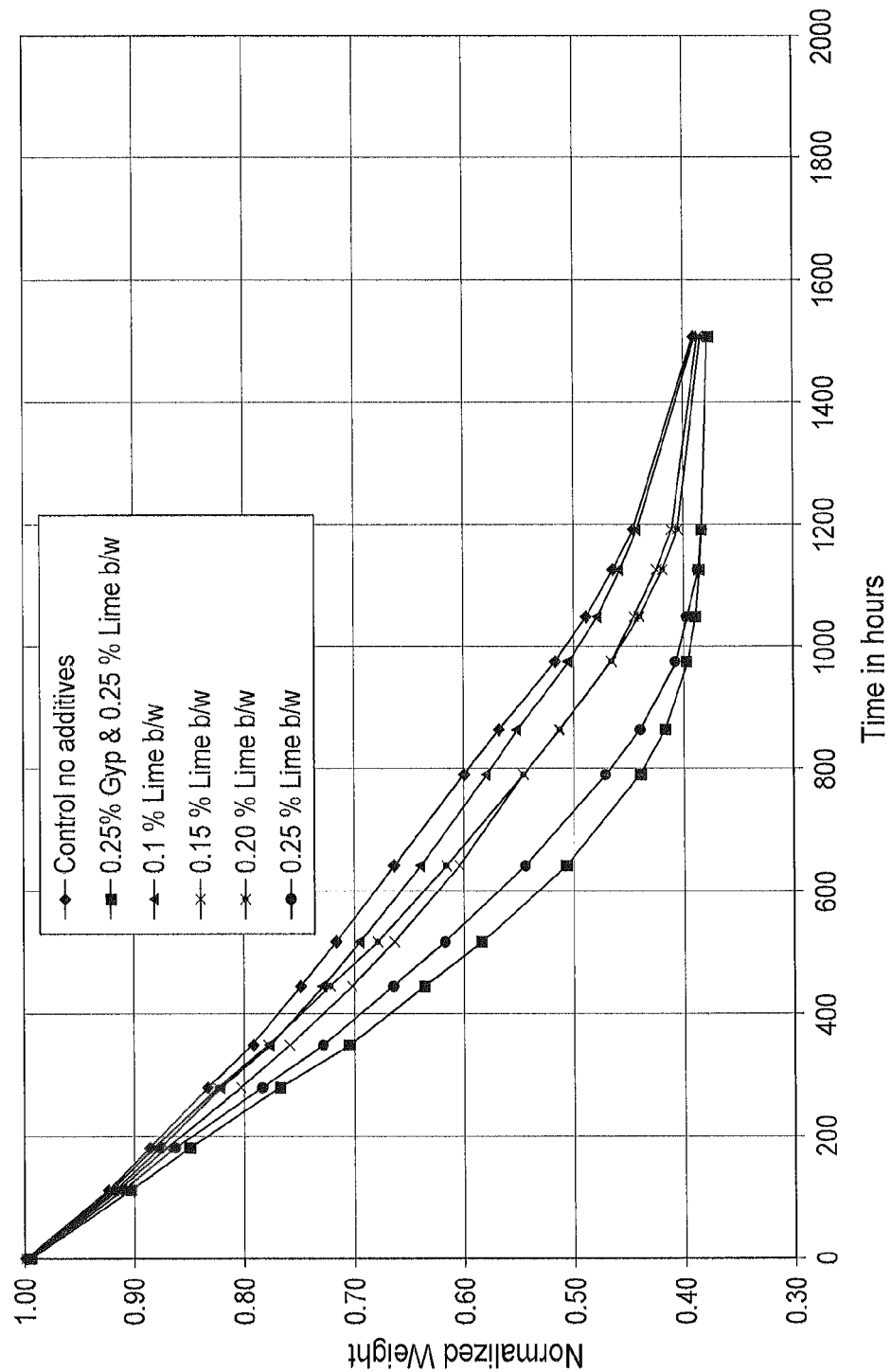
FIG. 15 is a graph showing the drying rate over time of FFT with varying lime additions.
Figure 16:
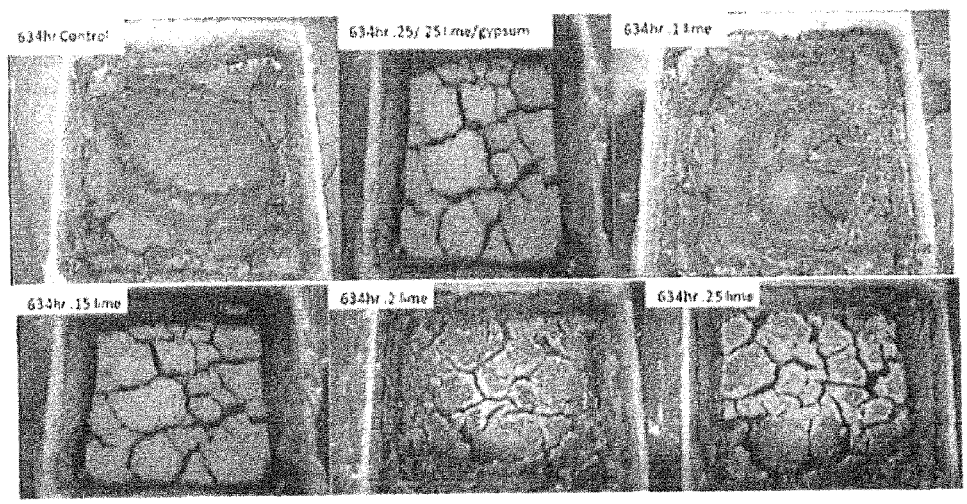
FIG. 16 is a photograph of the FFT with varying lime additions of FIG. 15.

Boxes were constructed and lined with plastic. Fans were used to ensure a consistent and rapid drying rate. As shown in FIG. 14, there was a reduction in evaporation rate with gypsum addition (0.1% gypsum by weight, 0.15% gypsum by weight, 0.2% gypsum by weight, 0.25% gypsum by weight, and 0.3% gypsum by weight) relative to the FFT alone. This behaviour is typical of soils with elevated salt content since the salt precipitation tends to seal the pore throats and soil channels through which the water evaporates. Further, it can be seen from FIG. 15 that when lime was added (0.25% gypsum by weight/0.25% lime by weight, 0.1% lime by weight, 0.15% lime by weight, 0.2% lime by weight, and 0.25% lime by weight), there was an increase in evaporative drying via two mechanisms. The first is the increased cracking which increases the surface area and therefore the evaporation rate (see FIG. 16). The second is a potential reduction in the total dissolved salts due to a cold lime softening effect. The elevated pH due to the lime addition precipitates calcium carbonate (due to the calcium and bicarbonate concentrations) from the FFT pore water. These salts are then no longer available to concentrate at the sample surface as drying takes place, FIGS. 15 and 16 also show the synergistic effect of lime and gypsum addition, where the best performance is seen with the combination of reagents.

Figure 17:
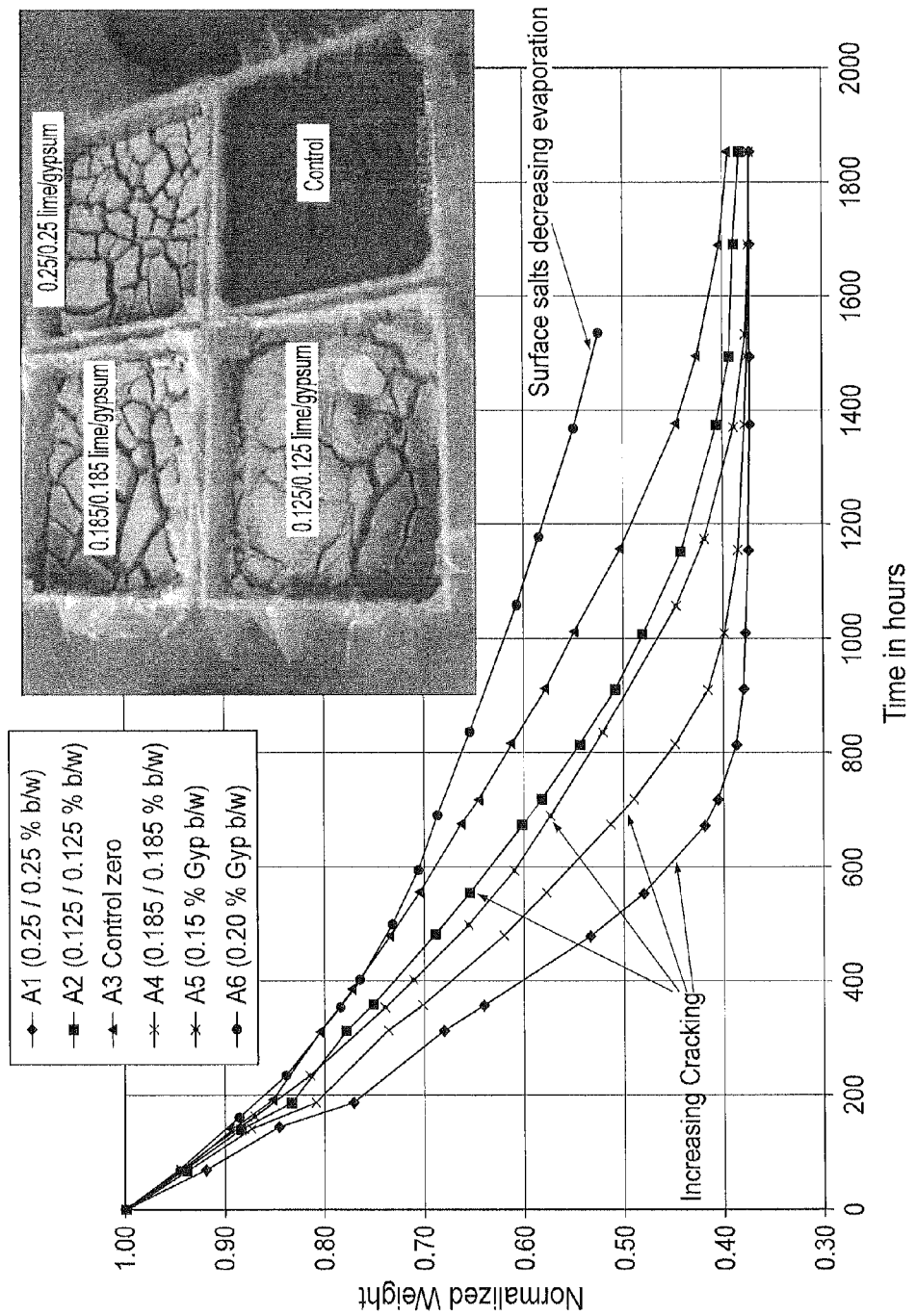
FIG. 17 is a graph showing the evaporative drying rate over time of FFT with various lime and gypsum combinations. The inset is a photograph of the samples.

FIG. 17 shows both the salt shut off of evaporation, and the optimization that occurs with cracking of the sample surface (i.e., the greater the cracking, the greater the evaporation rate, just as was observed in the smaller scale tests). The high gypsum content tailings dewatered more slowly than the control (untreated FFT) due to salt accumulation at the surface, hindering evaporation. In the lime gypsum combinations, the inset shows the increase in cracking with lime and gypsum in combination, and the figure shows the concomitant increase in dewatering rate.

Figure 18:
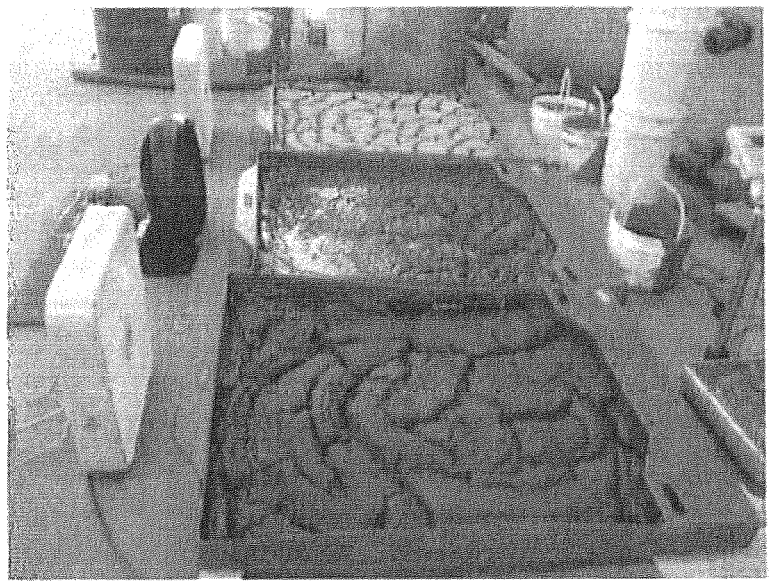
FIG. 18 is a photograph showing the dewatering behavior for 0.25% lime, 1000 g/tonne A3338 polymer, and untreated FFT samples (top to bottom).

In order to assess the cracking phenomenon, 150 kg tests were conducted with shallow pans to maximize the area of the deposit, and thus the cracking behaviour. As shown in FIG. 18, there was significantly greater cracking for the lime treated sample compared to either the polymer treated or the control FFT samples. The upper sample is the lime/gypsum treated FFT, followed by the polymer treatment, and then the control or untreated FFT. However, this experimental set up did not permit weighing of the samples as drying occurred, and the shallow aspect ratio did not allow for proper quantification or qualitative assessment of the cracking depth. Yet it can be seen that there are significant differences in drying rate. The lime treated FFT dried much faster than either the polymer treated or untreated FFT samples (FIG. 18).

The scale of this experiment enabled collection of run-off water. The water chemistries of selected samples are set out in Table 4. Depending upon the additives, the lime softening effect was evident by the reduction of the total dissolved salts when lime was added. Even with some gypsum addition, the appropriate amount of lime resulted in a net decrease in the total dissolved salts. Without being bound by any theory, it may be possible to improve cracking and dewatering behaviour, and decrease the effect of evaporative reduction with salt precipitation.

d) Lab Pilot Rim Ditch Simulation (4000 kg)

Figure 19:
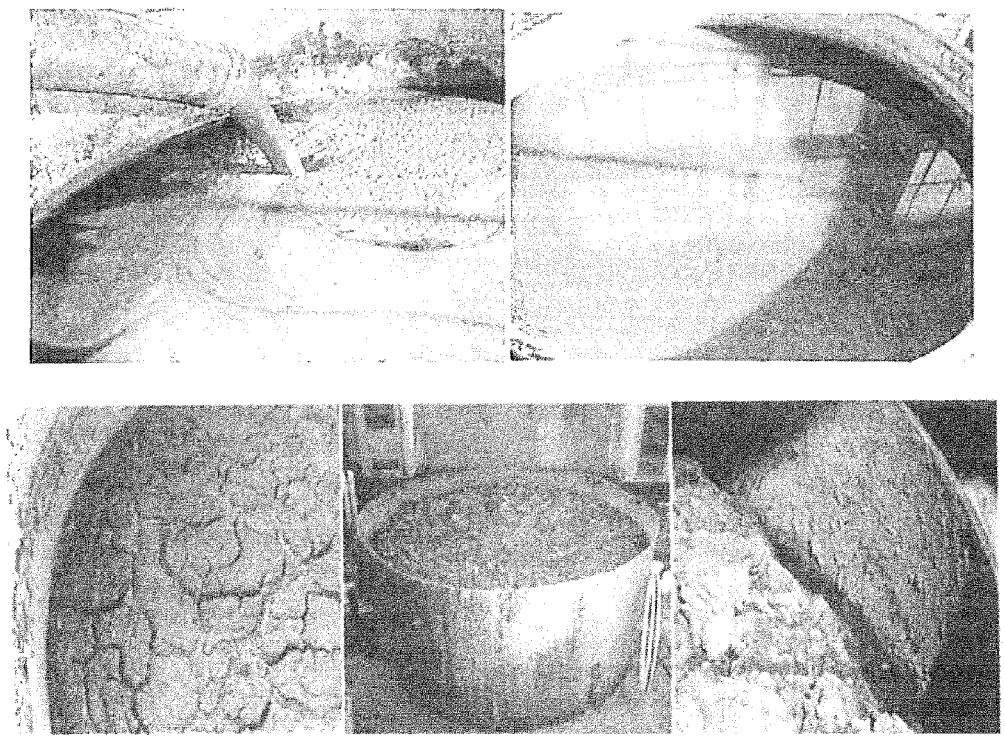
FIG. 19 is a photograph showing the initial pour for a 4 m$^3$ dewatering test with a high molecular weight, medium charge density anionic polyacrylamide flocculant at 1360 g/tonne solids (initial solids content of 25%) (top panel); and rim ditch water release showing a close up of cracking, view after ditching, and water collecting in the rim ditch (bottom panel, left to right).
Figure 20:
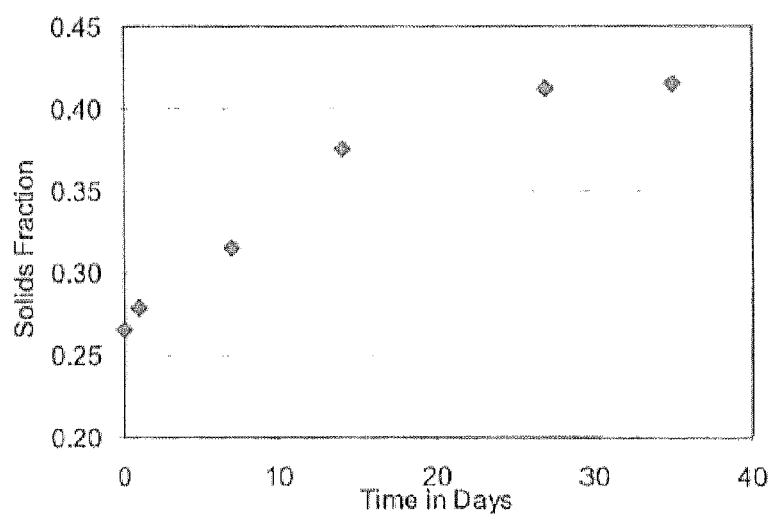
FIG. 20 is a graph showing the solids fraction increase over time for the 4 m$^3$ rim ditch test.

Since it is generally thought that drainage dominates in rim ditch applications, a large scale test was conducted (FIG. 19). Approximately 4 m$^3$ of 25% solids treated FFT (Polymer E, a medium to high charge density, high molecular weight polyacrylamide) at 1360 g/tonne of solids) was left to dewater over several weeks. An initial rapid water release was observed. FIG. 19 shows the cracking behavior and settling after about twenty-eight days, with water still collecting in the ditch that was created to collect drainage water. The upper left photograph shows the initial filling of the bin with the polymer treated FFT, and the upper right photograph shows the initial water release. The bottom left and bottom centre photographs show the cracking occurring after the initial water was removed and evaporation is occurring. The bottom right photograph shows the rim ditch that was created and the deposit water continuing to collect. FIG. 20 shows the average solids content increase in the bin as drainage water was removed. This demonstration of rapid dewatering, coupled with the previous smaller scale test results, confirmed that polymers would be suitable for rim ditch applications.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A process of dewatering tailings comprising:
   mixing the tailings with a sufficient amount of an additive or a mixture thereof;
   depositing the resulting mixture into a disposal area;
   pumping water from the deposit to one or more sumps, and allowing the deposit to reach a sufficient strength; and
   removing remaining deposit water and rainfall through one or more of a network of ditches, a decant tower, or a plurality of dike drainage structures to yield a non-segregating deposit for reclamation.

2. The process of claim 1, wherein the tailings and additive are combined within a mixer.

TABLE 4

| Pore Waters | Ca | K | Mg | Na | S | Fe | Cl | SO$_4$ | HCO$_3$ | CO$_3$ | pH | IB | TDS |
|---|---|---|---|---|---|---|---|---|---|---|---|---|---|
| FFT | 18 | 18 | 13 | 1327 | 47 | 0 | 937 | 135 | 1228 | 251 | 8.4 | 1.04 | 3974 |
| FFT, 0.25% lime | 8 | 12 | 9 | 885 | 42 | 3 | 941 | 48 | 0 | 441 | 10.53 | 0.945 | 2390 |
| FFT, 0.125% gypsum, 0.125% lime | 14 | 13 | 4 | 1159 | 333 | 0 | 964 | 954 | 0 | 0 | 9.39 | 1.1 | 3439 |

3. The process of claim 1, wherein additive is combined with the tailings at an in-line treatment point under conditions conducive to proper mixing.

4. The process of claim 1, further comprising monitoring one or more parameters of the mixture wherein the parameter is selected from electrical resistance, capacitance, conductivity, visual flocc structure or particle characterization, pressure drop profile, capillary suction time, or velocity/flow.

5. The process of claim 1, wherein pumps and sumps are positioned remote from a point at which the mixture is deposited into the rim ditch.

6. The process of claim 1, comprising forming the network of ditches between the deposit and the sumps to channel the deposit water and rainfall or snow melt to the sumps.

7. The process of claim 1, wherein the decant tower comprises a cascade decant tower positioned at a lowest point of the deposit and having a variable weir to enable water flow into the sumps.

8. The process of claim 1, wherein the additive is selected from a flocculant, coagulant, an additive comprising at least one multivalent cation, a pH or rheology modifying reagent, or a mixture thereof.

9. The process of claim 8, wherein the tailings are combined with the additive prior to treatment with the flocculant.

10. The process of claim 8, wherein the tailings are combined with the additive following treatment with the flocculant.

11. The process of claim 8, wherein the flocculant comprises a polyacrylamide anionic flocculant.

12. The process of claim 8, wherein the coagulant comprises lime, or a mixture of lime and gypsum.

13. The process of claim 8, wherein the at least one multivalent cation is selected from a divalent cation or a trivalent cation.

14. The process of claim 8, wherein the reagent is selected from sulphuric acid or carbon dioxide.

15. The process of claim 1, wherein the tailings are fluid fine tailings.

* * * * *